United States Patent
King et al.

(10) Patent No.: US 6,904,450 B1
(45) Date of Patent: Jun. 7, 2005

(54) METHOD AND SYSTEM FOR CUSTOMIZABLE NETWORK DATA RETRIEVAL

(75) Inventors: Christopher R. King, College Station, TX (US); Andrew L. Brasseux, College Station, TX (US); Duane T. Palmer, Bryan, TX (US)

(73) Assignee: Geodata Publishers, Inc., College Station, TX (US)

( * ) Notice: Subject to any disclaimer, the term of this patent is extended or adjusted under 35 U.S.C. 154(b) by 678 days.

(21) Appl. No.: 09/635,373

(22) Filed: Aug. 9, 2000

(51) Int. Cl.[7] ............................................. G06F 15/16
(52) U.S. Cl. ........................ 709/203; 709/218; 707/10; 715/526
(58) Field of Search ................................ 709/203, 213, 709/218–219; 707/9–10; 715/526, 501.1

(56) References Cited

U.S. PATENT DOCUMENTS

| | | | |
|---|---|---|---|
| 5,774,869 A | | 6/1998 | Toader ........................ 705/10 |
| 5,809,247 A | * | 9/1998 | Richardson et al. ........ 709/218 |
| 6,009,429 A | * | 12/1999 | Greer et al. .................. 707/10 |
| 6,226,655 B1 | * | 5/2001 | Borman et al. .......... 715/501.1 |
| 6,286,001 B1 | * | 9/2001 | Walker et al. ................. 707/9 |
| 6,389,458 B2 | * | 5/2002 | Shuster ....................... 709/213 |
| 6,446,111 B1 | * | 9/2002 | Lowery ...................... 709/203 |
| 6,567,843 B1 | * | 5/2003 | Schumacher ............... 709/203 |
| 6,572,662 B2 | * | 6/2003 | Manohar et al. ............ 715/526 |
| 6,587,873 B1 | * | 7/2003 | Nobakht et al. ............ 709/219 |
| 2001/0054085 A1 | * | 12/2001 | Kurganov ................... 709/218 |

FOREIGN PATENT DOCUMENTS

| | | | |
|---|---|---|---|
| EP | 0 957 437 A2 | 11/1999 | ........... G06F/17/30 |
| WO | WO 98/43381 | 10/1998 | |

OTHER PUBLICATIONS

PCT Invitation to Pay Additional Fees and Communication Relating to the Results of the Partial International Search, mailed Jan. 7, 2003, in re International Application No. PCT/US01/24929 filed Aug. 8, 2001.

* cited by examiner

*Primary Examiner*—Wen-Tai Lin
(74) *Attorney, Agent, or Firm*—Baker Botts L.L.P.

(57) ABSTRACT

A client-side director is presented. The director is free of a universal resource locator entry element and provides web-browsing capabilities to a user using services provided by an operating system. The director displays a web page associated with a first web site in the site list. The director may also be used to collect network performance statistics between the client and a remote site. A web page may be filtered by removing links listed as forbidden by site criteria. One or more content items may be generated by the users of the director and distributed by a channel server to other users. The channel server uses a unique identifier associated with each director and a subscriber database to determine which directors to send the content to. An identifier module and an identifier database are used by the channel to distribute the content to the directors.

33 Claims, 5 Drawing Sheets

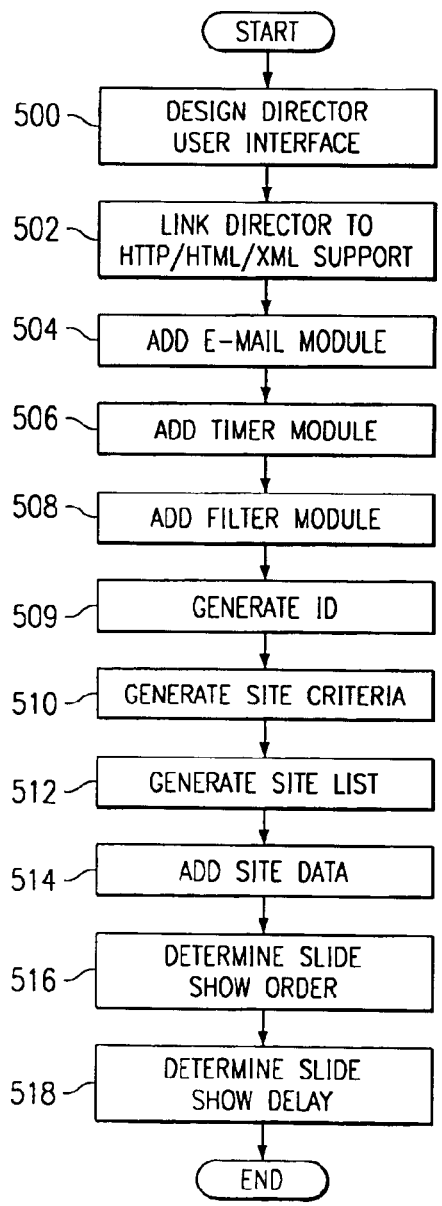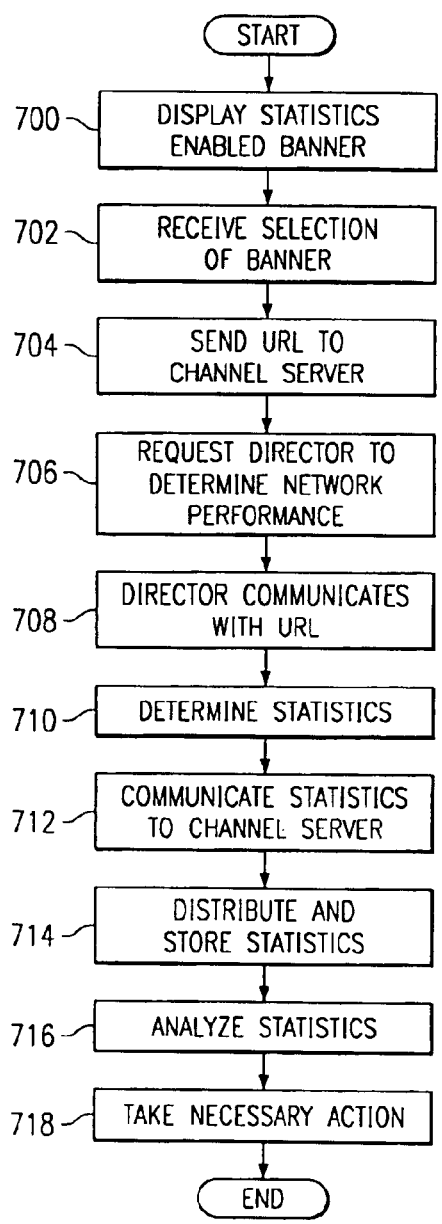

METHOD AND SYSTEM FOR CUSTOMIZABLE NETWORK DATA RETRIEVAL

TECHNICAL FIELD OF THE INVENTION

This invention relates in general to data processing and, more particularly, to a method and system for customizable network data retrieval.

BACKGROUND OF THE INVENTION

As computers have grown increasingly important in today's society, the quantity of information available on the Internet has also increased. The increased quantity of information available on the Internet has also increased the amount of web surfing people do while at home and at work. Often, corporations desire to control the amount of Internet surfing done by employees while also enjoying the benefits provided by a corporate intranet. Also, business often want to allow use of the Internet, while also limiting the content which can be retrieved. Similarly, schools have often struggled with providing an environment for students to use the Internet while restricting access to inappropriate content. Traditional web browsers have not been well suited to controlling the content retrieved by people.

SUMMARY OF THE INVENTION

The present invention addresses the problems and disadvantages associated with prior systems. In particular, the present invention provides a method and system for customizable network data retrieval.

One aspect of the present invention includes a controlled web browsing system comprising a customizable director. The customizable director being operable to provide web browsing capabilities and being free of a uniform resource locator entry element. The customizable director comprising a border portion having a forward element, a play element and a back element, and a display portion operable to display a web page, the web page having a link, the link having an associated second web page. The system further comprises at least one predetermined uniform resource locator associated with the customizable browser, each uniform resource locator having an associated cycle time.

Another aspect of the present invention includes a method for controlled web browsing comprising providing a web browser and displaying, using the web browser, a first web page having a first link, the first link having an associated second web page. The method further comprises selecting the first link. In addition, the method further comprises determining whether a predetermined cycle time associated with the first web page has expired and displaying a third web page in response to the expiration of the predetermined cycle time.

A further aspect of the present invention includes a method for controlled web browsing comprising customizing a director operable to provide web browsing capabilities and determining a first web page to present to a user associated with the web browser, the first web page having a link associated with a second web page. The method also comprises determining a cycle time associated with the first web page, the cycle time indicating the length of time the first web page is to be displayed to the user and filtering the second web page based on site criteria associated with the web browser. In addition, the method comprises preventing the user from requesting a third web page distinct from the first and second web pages.

Another aspect of the present invention includes a method for directed web browsing comprising providing a graphical user interface, displaying a folder on the graphical user interface, and displaying a director icon in the folder. The director icon has an associated director, and the director has an associated exclusive set of first web pages associated with the director. A user associated with the director is required to retrieve at least one of the first web pages prior to retrieving a second web page distinct from the first web pages. The method further comprises selecting a selected one of the first web pages to present to a user associated with the director in response to the selection of the associated director icon and determining a cycle time associated with the first web page in response to the selection of the selected one of the first web pages. The cycle time indicates the length of time the selected one of first web pages is to be displayed to the user. The method further comprises preventing the user from requesting a third web page distinct from the first and second web pages.

Yet another aspect of the present invention includes a channel server for controlled web browsing comprising an identifier module and an identifier database operable to communicate with the identifier module and storing at least one identifier. The system further comprises a subscriber database operable to communicate with the identifier module and associating at least one of the identifiers with at least one channel and a channel module operable to communicate with the identifier module and distribute content to the subscribers associated with the channels based on the channel. In addition, the system comprises a distribution module operable to communicate with the identifier module and retrieve content generated by a user associated with a director and an electronic mail module operable to communicate with the identifier module and communicate anonymous electronic mail between directors.

The present invention provides various technical advantages. Various embodiments of the present invention may provide some, all or none of these advantages. One such technical advantage is the capability to control the web sites which the user may visit by removing the ability of a user to directly type in a uniform resource locator (URL) or electronically paste one in from another application. In addition, a predetermined list of web sites may be provided to the user along with the web pages associated with the list of web sites so that the user may be limited to browsing only particular content. For example, a corporation may utilize the present invention to restrict employee access to only intranet content. For another example, a corporation may provide free Internet service in exchange for requiring the user to browse particular sites. Another technical advantage is the capability to present the web pages associated with the predetermined list of sites in a slideshow-like fashion. Yet another technical advantage is the capability to distribute content between users. The content may be distributed anonymously. Electronic mail may be also be sent anonymously to the person who generated the content. The reply to the anonymous electronic mail may also be made anonymously.

BRIEF DESCRIPTION OF THE DRAWINGS

A better understanding of the present invention will be realized from the detailed description that follows, taken in conjunction with the accompanying drawings, in which:

FIG. 2A is a table illustrating an exemplary embodiment of a site list associated with the customizable network data retrieval system of FIG. 2;

FIG. 6 is a flowchart illustrating a method for generating the director of FIG. 2;

FIG. 8 is a flow chart illustrating a method for collecting statistics using the director of FIG. 2.

DETAILED DESCRIPTION OF THE INVENTION

Companies often look for new and creative ways of marketing themselves, their products and their services. World Wide Web browsers are commonly used in both home and work environments for retrieving information. In the work environment, web browsers typically provide only limited capabilities to administrators for controlling the information retrieved by the user of the web browser. In the home and school environments, web browsers also provide only limited capabilities for a parent or authority figure to control which web sites may be visited by a user, such as a child, of the web browser. A customizable network data retrieval system provides the capability to administrators, parents and others to control the sites which can be visited and the information retrieved using the director associated with the customizable network data retrieval system.

Figure 1:
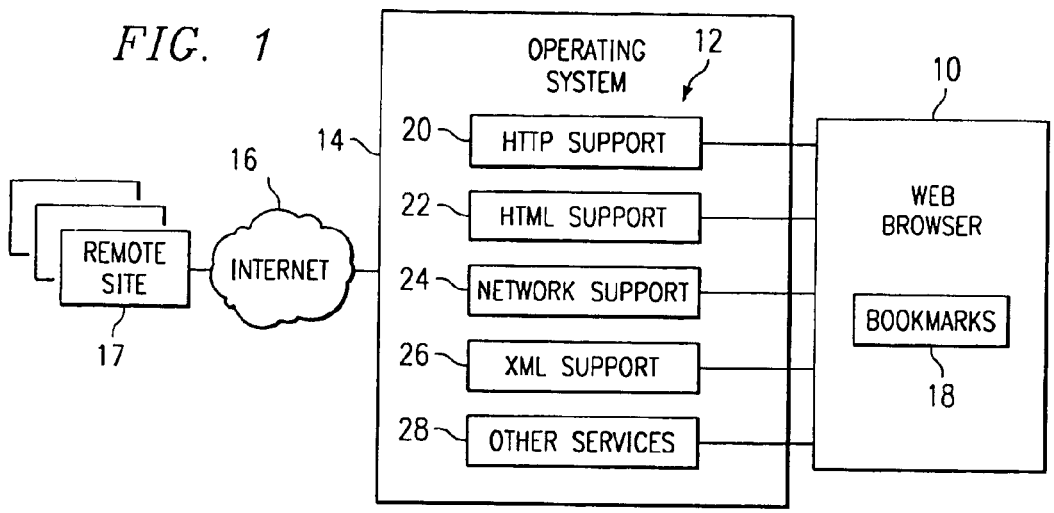
FIG. 1 is a block diagram illustrating a web browser utilizing various services provided by an operating system.

FIG. 1 is a block diagram illustrating a web browser 10 utilizing various services 12 provided by an operating system 14. Web browser 10 may communicate with a network 16 using operating system 14. Services 12 comprise Hypertext Transport Protocol (HTTP) support 20, Hypertext Markup Language (HTML) support 22, network support 24, Extensible Markup Language (XML) support 26 and other services 28.

Web browser 10 comprises any suitable interface for retrieving and displaying World Wide Web (web) pages, such as Internet Explorer by Microsoft Corporation of Redmond, Wash., or Netscape Communicator by Netscape Corporation of Santa Clara, Calif. Web browser 10 may also comprise one or more bookmarks 18 and a Uniform Resource Locator (URL) entry element 19. Bookmarks 18 comprise one or more web sites stored by a user of web browser 10 for easy revisiting. For example, bookmarks 18 may comprise a list of uniform resource locators (URLs). The URL entry element 19 comprises an input field operable to accept an arbitrary URL typed in by a user of browser 10. URL entry element 19 may be considered in contrast to hypertext links associated with web pages. A hypertext link provides a predefined URL to a particular web page and/or web site, while URL entry element 19 allows the direct entry of a URL by a user and the electronic pasting of a URL from another document.

Typically, web sites and web pages are identified by URLs indicating a protocol, a machine, a domain name and a location on the machine of the information to be retrieved. "Http://www.domain.com/index.html", for example, is a portion of a URL indicating the protocol "http", the machine "www" in the domain "domain.com" and that the data entitled "index.html" should be retrieved. The protocol portion indicates the particular protocol that should be used to retrieve the requested data, such as the hypertext transport protocol (HTTP) and the file transfer protocol (FTP). The protocol portion may also indicate a local file using "file". For example, "file://D|/test.txt" indicates a "file" on the local machine on the "D:" drive on a windows-based machine called "test-txt". In general, any suitable file identifier used by a particular operating system may be referred to using a "file:" type URL.

As used herein, a "web site" refers to the machine and domain name portion of a URL. Said another way, a web site encompasses all of the web pages associated with that particular site. Web sites typically contain one or more web pages. Also as used herein, a web page comprises information to be retrieved from a particular web site. More specifically, a web page may comprise a hypertext markup language (HTML) document and associated textual and graphic information, a common gateway interface (CGI) script, a Java applet, a Java application, an ActiveX control, a web form, and any other suitable dynamic or static web based method of providing information in any combination.

HTTP support 20 comprises any suitable combination of software and/or hardware operable to support the use of the HTTP protocol by web browser 10. For example, HTTP support 20 may provide the ability to send and retrieve data using the HTTP protocol using the Internet Protocol (IP).

HTML support 22 comprises any suitable combination of hardware and/or software operable to decode and format web pages and other documents formatted using HTML. For example, HTML support 22 may comprise dynamic link libraries (DLL) operable to interpret HTML codes, cascading style sheets (CSS), JavaScript, and other related web formatting and display technologies.

Network support 24 comprises any suitable combination of hardware and/or software operable to provide network connectivity and communications capabilities to web browser 10. For example, network support 24 may comprise support for the Ethernet protocol, the Transmission Control Protocol/Internet Protocol (TCP/IP), the asynchronous transfer mode (ATM) protocol, the fiber distributed data interface (FDDI) protocol, the frame relay protocol, the SONET protocol and other suitable networking protocols and technologies.

XML support 26 may comprise any suitable combination of hardware and/or software operable to interpret and process XML encoded data.

Other services 28 may comprise other services used by web browser 10 for viewing and interpreting web pages and other documents. For example, other services 28 may comprise a Java Virtual Machine (JVM) operable to support the Java language and execute Java applications and applets, Macromedia Flash support, virtual reality modeling language (VRML) support, support for other standard generalized markup languages (SGML), document type definition (DTD) support, ActiveX support, and support for other suitable data manipulation and presentation technologies.

Network 16 comprises a data communication system operable to communicate data between web browser 10 and remote sites 17. For example, network 14 may be the Internet, an ATM network, an Ethernet network, a TCP/IP network, an intranet or any other suitable computer networking technology. In one embodiment, network 16 comprises the Internet.

Remote site 17 comprises one or more web sites having one or more associated web pages accessible over network 16 by web browser 10.

In operation, web browser 10 retrieves web pages from remote site 17. The web pages retrieved from remote site 17 are communicated over network 16 to operating system 14. Network support 24 receives the web pages and communicates the web pages to web browser 10 for processing. Web browser 10 uses HTTP support 20, HTML support 22, XML support 26 and other services 28 to interpret and display the web pages retrieved from remote site 17.

Figure 2:
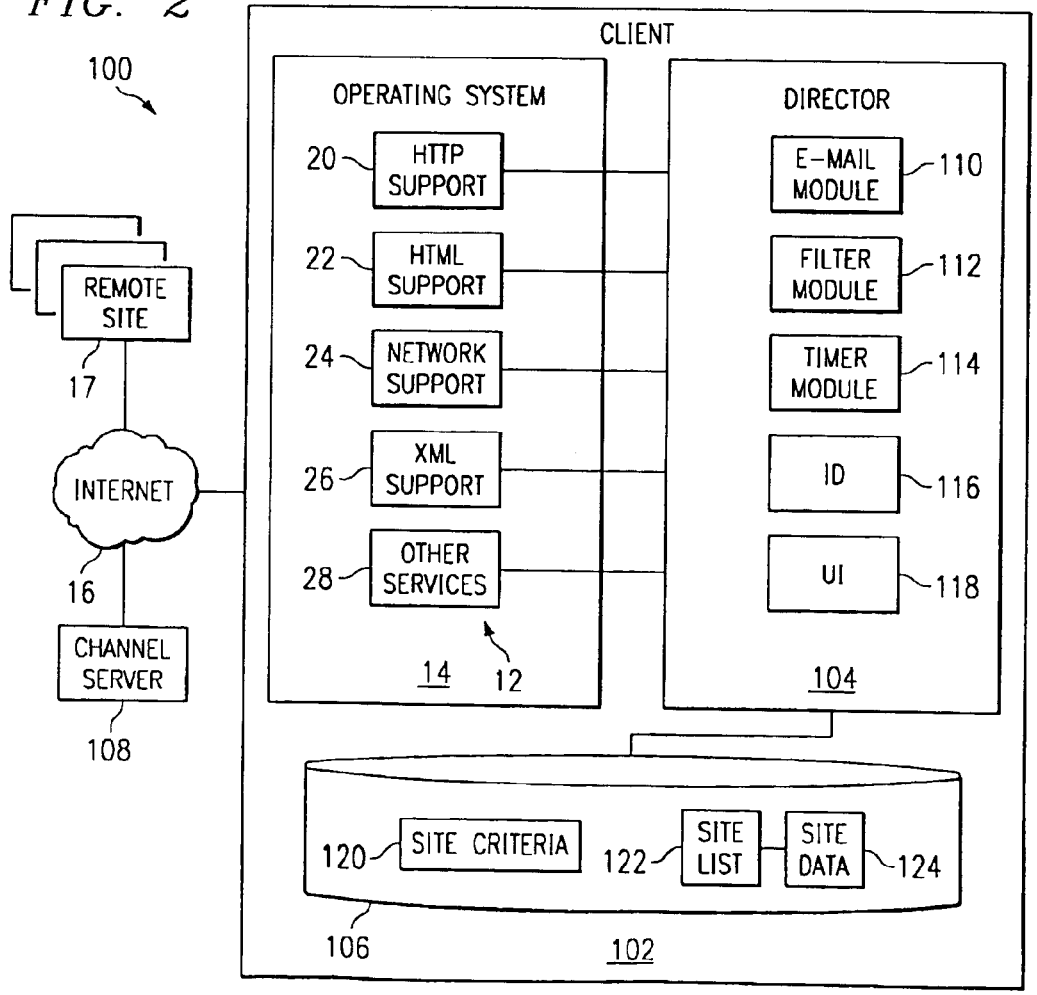
FIG. 2 is a block diagram illustrating a customizable network data retrieval system using a director.

FIG. 2 is a block diagram illustrating a customizable network data retrieval system 100. System 100 comprises a client 102, network 16 and remote site 17. Client 102 comprises operating system 14, a director 104, and storage 106. Director 104 comprises an e-mail module 110, a filter module 112, a timer module 114, an ID 116 and a user interface 118. Storage 106 stores site criteria 120, a site list 122, and site data 124.

Client 102 comprises hardware and/or software operable to support the execution of operating system 14 and director 104. For example, client 102 may comprise a PC, a Macintosh, a UNIX machine, a Linux machine, a personal digital assistant (PDA), or any other suitable electronic device. Director 104 comprises an interface for viewing and interacting with web pages. More specifically, director 104 is operable to retrieve web pages and format the web pages for display to a user associated with director 104. Director 104 may receive and handle selections of hypertext links associated with the web pages. Director 104 may utilize services 12 provided by operating system 14, may utilize services 12 provided by third-parties, and/or may provide any or all of services 12 internally.

Storage 106 comprises any suitable computer-readable storage and/or memory devices. For example, storage 106 may comprise dynamic random access memory (DRAM), static random access memory (SRAM), magnetic storage devices and/or optical storage devices in any combination. It should be noted that while storage 106 is discussed in the singular, storage 106 may comprise multiple storage-related elements.

Channel server 108 comprises any suitable combination of hardware and/or software operable to communicate with client 102 over network 16. Channel server 108 may provide content distribution and management capabilities between clients 102. Channel server 108 is described in greater detail in association with FIG. 5.

Electronic mail module 110 comprises a portion of director 104 operable to send and receive mail over network 16 using channel server 108. Filter module 112 comprises a portion of director 104 operable to examine data received from remote site 17 and modify the data based on site criteria 120. More specifically, filter module 112 may remove links to sites disallowed by site criteria 120. In addition, filter module 112 may determine whether URLs provided to director 104 are contained within a list of allowed URLs.

As used herein, links comprise any suitable method for specifying navigable relationships between documents. In one embodiment, the links comprise HTML links. Alternatively, the links may comprise any suitable indications of relationships between data or other suitable hypertext links.

Timer module 114 comprises a portion of director 104 operable to provide timing information to director 104. For example, timer module 114 may comprise software operable to determine when a predetermined time has elapsed and signal director 104 to take action.

Identifier 116 comprises a numeric, alphanumeric or other suitable identifier for uniquely identifying a particular director 104. More specifically, identifier 116 may be used to distinguish each instance of director 104 from each other instance of director 104.

Site criteria 120 comprises a list of allowed and disallowed web sites. Site criteria 120 may be used by director 104 and filter module 112 to control the web sites available to a user of director 104. Site criteria 120 may use wildcards in any portion of the URL indicating allowed and disallowed web sites. For example, an allowed group of web sites may be indicated by "*.domain.com" which would indicate any host within "domain.com" is allowed. In general, any suitable combination of wildcards, regular expressions and other techniques may be used to indicate allowed and disallowed URLs.

Site list 122 comprises a list of web sites and associated web pages provided for viewing by users of director 104. Site data 124 comprises the web pages associated with the web sites listed in site list 122. Site data 124 may comprise data associated with a subset of the sites listed in site list 122. For example, site list 122 may comprise sites referring to locally stored web pages in site data 124 and external web pages stored on remote sites 17.

In operation, director 104 is activated by a user. Director 104 then examines site list 122 to determine the first site to display to the user. Director 104 then loads the site data 124 or external data from remote server 17 associated with the first entry in site list 122 and displays the data to the user.

FIG. 2A is a table illustrating an exemplary embodiment of site list 122. FIGS. 2 and 2A are discussed together for increased clarity. In the exemplary embodiment of FIG. 2A, site list 122 comprises a site 150, an alternate site 152, a cycle time 154 and a banner 156. Site 150 comprises a URL indicating a site the user of director 104 may visit. Typically, site 150 indicates a file stored in site data 124 to present to the user. Alternate site 152 comprises a URL indicating an alternate location for retrieval of the information listed in site 150. Cycle time 154 comprises an indication in seconds of how long director 104 is to display the indicated information in site 150 before moving on to the next site listed in site 150. Alternatively, cycle time 154 may be expressed in any other suitable time unit, such as milliseconds or minutes. Banner 156 comprises the text to present in a scrolling banner associated with director 104 and described in more detail in FIG. 3.

While director 104 is displaying information to a user, timer module 114 is counting down cycle time 154 to determine when the next site 150 is to be displayed to the user. More specifically, timer module 114 will instruct director 104 to load the next site 150 in site list 122 when the associated cycle time 154 expires.

Referring to the example of FIG. 2A, three sites 150 are listed, a first exemplary entry 160, a second exemplary entry 162 and a third exemplary entry 164. First exemplary entry 160 in site list 122 indicates a site 150 to be loaded is the file "index.html" on the "C" drive on the local machine. If director 104 is unable to retrieve "index.html" from the local machine, such as when the file has become corrupted or the file is unavailable, director 104 will attempt to load the information from alternate site 152. Director 104 passes cycle time 154 of 20 seconds to timer module 114. Director 104 also displays banner 156 of "Welcome!". If the user does not interact with director 104 and specify some other action to perform, then timer module 114 will instruct director 104 to load second exemplary entry 162 after 20 seconds have elapsed. Second exemplary entry 162 indicates a site 150 that is a file "special.html" in the directory "products" under the directory "data" on the "C" drive on the local machine. Cycle time 154 of 25 seconds is passed by director 104 to timer module 114. As no banner 156 is specified, the previous banner remains displayed. Alternatively, if no banner 156 is specified then no banner 156 may be displayed.

As before, if the user does not otherwise interact with director 104, third exemplary entry 164 in table 122 will be loaded by director 104 in response to timer module 114 indicating that 25 seconds have elapsed. Third exemplary entry 164 in table 122 indicates that a common gateway interface (CGI) script called "inventory.cgi" in the directory "Price List" on the "C" drive of the local machine is to be loaded by director 104 and displayed to the user. Since cycle time 154 is specified as zero, director 104 will pause at third entry 164. If a cycle time was specified, for example, 60 seconds, then after 60 seconds have passed, timer module 114 would instruct director 104 to load the next entry in table 122. In the example of FIG. 2A, the next entry would be first exemplary entry 160. If no other entries of sites 150 are indicated in table 122, then director 104 would reload first entry 160. In this way, director 104 may present a slide show of information to the user which is continuously updated based on cycle time 54 in order to continuously present information to the user. Alternatively, a simple list of sites 150 may be provided with director 104 without an associated cycle time 154. When no cycle time 154 is specified, a default time may be applied to all sites 150 in table 122 to determine the length of time director 104 is to display the sites 150. The default time may also be used in association with cycle time 154. For example, if no cycle time 154 is specified, then the default time may be used, but when cycle time 154 is specified, then cycle time 154 may be used.

Table 122 may contain an arbitrary number of sites 150 and associated alternate sites 152 and cycle times 154. It should be noted that site 150 and alternate site 152 may have any suitable relationship as desired by the configurator of site list 122. For example, while alternate site 152 may indicate an alternate location for the data indicated in site 150, alternate 152 may also provide other information, such as updated files, technical support or other suitable content. Thus, channel server 108 may instruct director 104 to delete particular site data 124 so that an alternate site 152 specifying a software update site is loaded by director 104 so that an update is received by director 104. Sites 150 and alternate sites 152 may include URLs referring to files, programs, scripts, applets, applications, and any other suitable content.

Identifier 116 may be used in connection with e-mail module 110 when communicating with channel server 108 to uniquely identify director 104 and distinguish director 104 from other directors 104. User interface 118 comprises an output on a visual display device operable to accept input from a user and provide output to the user. User interface 118 is described in more detail in association with FIG. 3.

Figure 3:
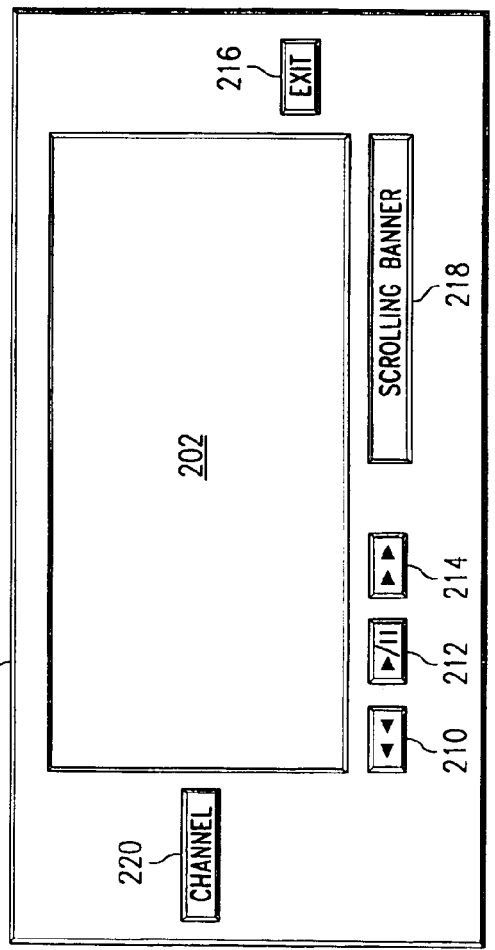
FIG. 3 is a diagram illustrating an exemplary embodiment of a user interface of the director of FIG. 2.

FIG. 3 is a diagram illustrating an exemplary embodiment of user interface 118 of director 104. User interface 118 may comprise a border 200 and a display area 202. Border 200 may comprise one or more navigation buttons, such as a back button 210, a play/pause button 212 and a forward button 214, an exit button 216, a banner region 218 and one or more channel buttons 220.

Border 200 may comprise a configurable area of director 104 for a customized display surrounding display area 202. The size of border 200 may be varied or deleted entirely by the customizer of director 104. The customizer of director 104, as used herein, may comprise a company, an administrator, a parent, a school, a teacher, or other suitable entity who is capable of configuring director 104 for the intended use of director 104 by the customizer. For example, a company deploying director 104 to corporate users may customize border 200 with the company's logo. For another example, a company deploying director 104 to customers may customize border 200 with advertisements for the company's products. In general, border 200 may be configured with any suitable graphical and textual data as desired by the customizer.

Display area 202 comprises a display area on a visual output device associated with client 102 for displaying data and information associated with director 104 to the user. More specifically, display area 202 displays site data 124 and web pages retrieved from remote sites 17 as interpreted by services 12.

As a user views data in display area 202, director 104 tracks the URLs associated with the content viewed in display area 202. The user may navigate previously viewed sites with back button 210. The user may return to sites after pressing back button 210 using forward button 214. Play/pause button 212 may be used to pause or continue the slide show presentation of sites listed in site list 122. More specifically, button 212 toggles between a play setting and a pause setting for the slide show as described previously with reference to FIGS. 2 and 2A. When button 212 is in the pause setting, pressing button 212 will switch button 212 to the play position and allow the slide show to continue. Similarly, when button 212 is in the play position pressing button 212 will switch it to the pause position and pause the slide show. In the pause position, timer module 114 will stop counting down cycle time 154 for cycling sites in 115 and site list 122. Alternatively, timer module 114 may continue to count down cycle time 154, but director 104 may ignore or hold the request to load the next site 150. Scrolling banner 218 comprises a region of border 200 providing scrolling text and/or graphical displays for presenting information to the user. Banner 218 may be varied in size or deleted by the customizer.

Each channel button 220 comprises an indication of a channel available for viewing by a user of director 104. Besides sites 150 in site list 122, director 104 may receive categorized content from channel server 108. In one embodiment, director 104 subscribes to particular channels available from channel server 108 and a channel button 220 is added to border 200 for each channel or groups of channels to which director 104 subscribes.

In operation, after director 104 is initialized, director 104 presents the content stored in site data 124 and associated with the first site in site list 122 to the user. As seen in FIG. 3, director 104 does not provide the user with the ability to directly enter a URL. Thus, a user of director 104 is restricted to visiting sites linked from the content presented initially by the sites in site list 122 and by external sites 17 linked to the content and site data 124. Director 104 therefore provides the advantage of being able to control where the user of director 104 goes on the web. For example, a corporation may deploy director 104 to allow the use of a corporate intranet while preventing employees from surfing the Internet in general. For another example, director 104 may be used in the home or in schools to control which sites may be accessed by children using director 104.

FIG. 3 presents an exemplary embodiment of user interface 118 for director 104, however, director 104 may be configured with any user interface 118 as desired by the customizer of director 104. The customizer, such as a sponsor providing a service, may use the customizability and control feature offered by director 104 to provide advertising and other information to users of director 104. For example, a sponsor such as a corporation may offer a free Internet service to users of director 104. User interface 118 of director 104 may be customized by the corporation providing the free Internet service to provide advertising to the user of the free internet service in exchange for providing the free internet service. However, in contrast to existing free Internet services which typically only present advertising to the user, site list 122 allows the corporation to control which sites the users of directors 104 visit. Thus, the corporation could control the sites the user sees, such as by directing them to product information regarding products associated with the corporation, before the user is presented with links to the Internet in general.

In one embodiment, display 202 displays data and information, such as site data 124, retrieved by director 104. Buttons 210, 212, and 214 allow for the navigation of sites retrieved by director 104. Exit button 216 allows the user to terminate the operation of director 104.

Figure 4:
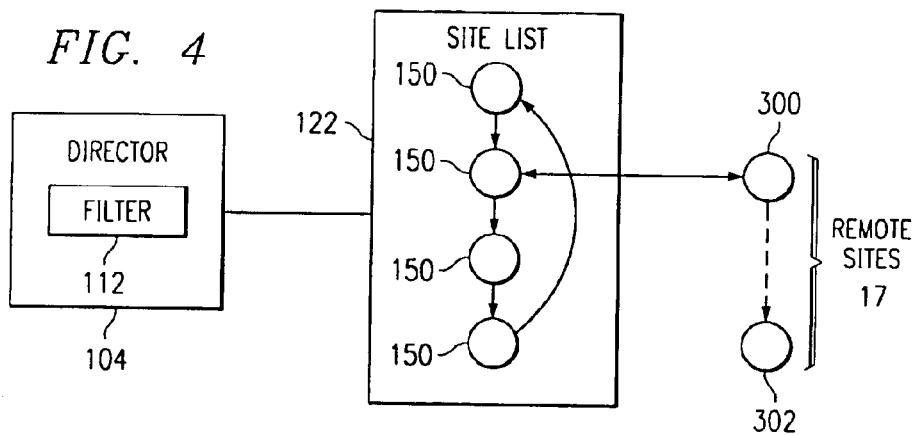
FIG. 4 is a block diagram illustrating operation of the director of FIG. 2.

FIG. 4 is a block diagram illustrating operation of director 104. As data associated with sites 150 is presented to the user through director 104, the user may select links to remote site 17 included as links in the content retrieved from the sites 150. When a user selects a link in the web page associated with site 150, director 104 may retrieve a remote web page 300 associated with a remote site 17 associated with the link. Filter 112 then filters the retrieved web page using information in site criteria 120. More specifically, site criteria 120 indicates allowed and disallowed URLs, portions of URLs, domains, and other suitable information. Filter 120 analyzes the web pages retrieved from remote site 300 for disallowed URLs or URL portions. Filter 112 then removes the link to the remote site, such as forbidden remote site 302, from the web page retrieved with site 300. By removing the link in web pages retrieved from remote site 17, the user of director 104 is prevented from visiting forbidden remote sites 302. More specifically, as director 104 has specifically omitted the capability for directly specifying URLs, removal of links to forbidden sites 302 by filter 112 prevents director 104 from retrieving web pages associated with the forbidden sites. Also, filter 112 may remove text, graphics and other content from web pages based on criteria 120.

In one embodiment, director 104 may allow a user to enter arbitrary URLs. In this embodiment, filter 112 may examine entered URLs before the data associated with the entered URLs is retrieved. More specifically, filter 112 may examine the entered URL against criteria 120 to determine whether the entered URL is matched to allowed URLs indicated in criteria 120.

Site 150 specified in site list 122 may be displayed to the user of director 104 in a slideshow like fashion. Director 104 will present sites 150 listed in site list 122 one-by-one in a repeating fashion unless the user pauses the slideshow using play/pause button 212 or selects a link in the web page. The slideshow like presentation of sites 150 in site list 122 may be halted by indicating cycle time 154 of zero for a particular site 150 or selecting a link in the display web page.

Figure 5:
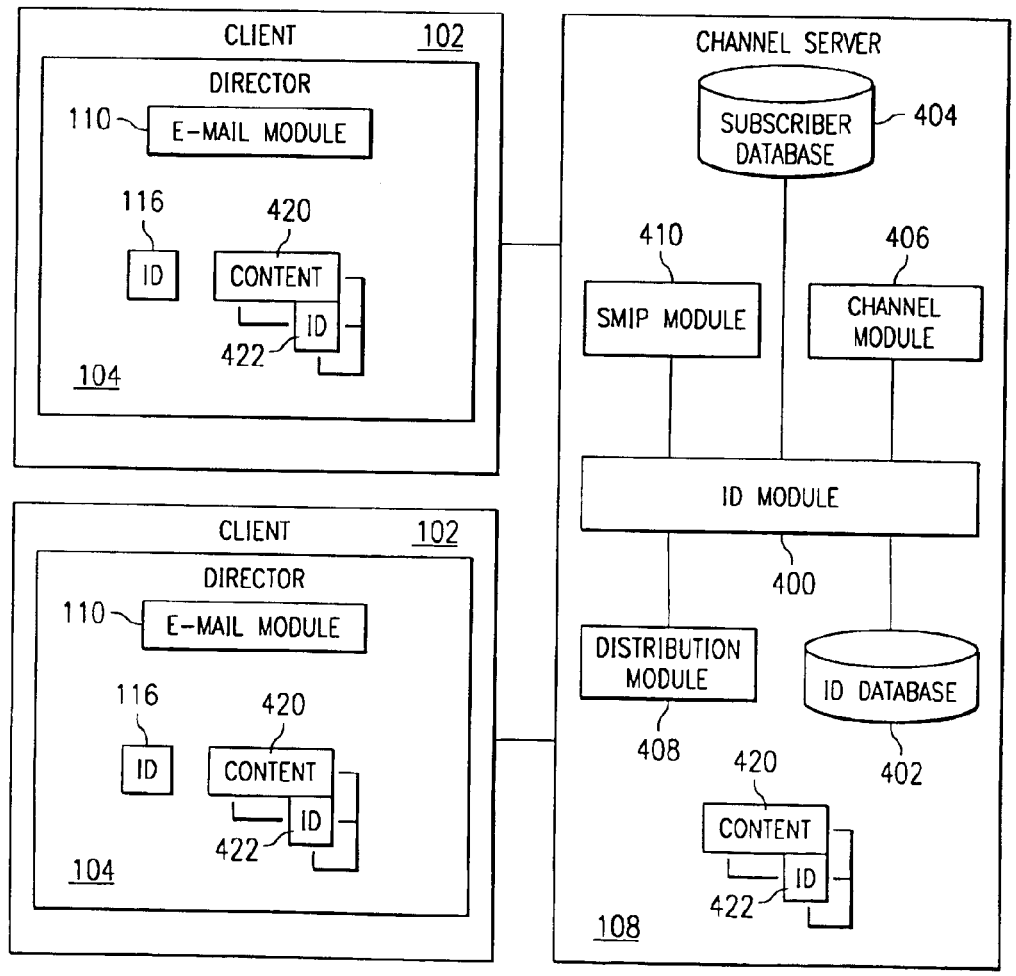
FIG. 5 is a block diagram illustrating details of a channel server and further details of clients associated with the customizable network data retrieval system of FIG. 2.

FIG. 5 is a block diagram illustrating details of channel server 108 and further details of clients 102. Channel server 108 comprises an identifier (ID) module 400, an identifier (ID) database 402, a subscriber database 404, a channel module 406, a distribution module 408, and a simple mail transport protocol (SMTP) module 410. Clients 102 and channel server 108 may further comprise one or more items of content 420. ID module 400 stores IDs 116 associated with clients 102 in ID database 402. ID module 400 is operable to maintain identification information associated with ID 116 in ID database 402. More specifically, ID module 400 may store a name, a mail address, a network address, a sponsor, and other suitable information for identifying director 104 in ID database 402. For example, the sponsor may indicate the customizer of director 104 and may be used in determining which channels to present to the user. ID module 400 may also store subscription information associated with director 104 in subscriber database 404. The subscription information may comprise one or more channels to which a particular director 104 is subscribed. ID database 402 comprises any suitable data storage and retrieval system, such as a hierarchical database, a flat file database or a relational database. Similarly, subscriber database 404 comprises any suitable data storage and retrieval system, such as a hierarchical database, a flat file database, or a relational database.

Channel module 406 comprises any suitable combination of software and/or hardware operable to provide and manage channels 412 available to directors 104. More specifically, channels 412 may comprise categories of information, such as fiction stories, arts and crafts, and computer information, to which users of director 104 may subscribe. Channel module 406 may provide the web pages and other data associated with the particular channels 412.

Distribution module 40B comprises any suitable combination of software and/or hardware operable to receive content 420 from directors 104 and distribute the content 420 to directors 104 which are subscribed to the channel 412 providing that particular content. More specifically, distribution module 408 may provide content to channel module 406 to be distributed based on channel 412 associated with content 420.

SMTP module 410 comprises any suitable combination of hardware and/or software operable to provide Internet electronic mail capabilities. Alternatively, electronic mail capabilities for use with other network systems may be provided. More specifically, SMTP module 410 interacts with e-mail module 110 and director 104 for communicating e-mail between directors 104.

Content 420 comprises one or more web pages generated by users of channel server 108 and/or users of directors 104 to be distributed to other users of other directors 104. For example, a particular user of a director 104 may write fiction stories for content 420 and distribute the fiction stories on a channel 412 called "fiction stories." Content 420 may comprise any combination of textual, graphical, auditory and animated data, as well as other types of data, which may be presented by client 102.

In operation, director 104 is installed and activated on client 102. Director 104 may then request the user to register with channel server 108. Any suitable information, such as a user name and password, may be requested as part of the registration process. Director 104 then communicates the registration information to channel server 108 along with the ID 116 associated with director 104 which has just been registered. Channel server 108 stores ID 116 and associated registration information in ID database 402 using ID module 400. Alternatively, director 104 may simply register ID 116 with channel server 108 without user interaction.

ID module 400 may also have previously stored information associated with IDs 116. For example, ID module 400 may already know that IDs one to ninety-nine are associated with a particular corporation or other customizer of director 104. ID module 400 may then request channel module 406 to provide particular channels to director 104 based on the ID 116. ID module 400 may also present all available channels provided by channel module 406 or a portion of the available channels 412 provided by channel module 406 for subscription by the user of director 104.

Once a user has subscribed to particular channels 412, subscriber database 404 is updated with the identifier 116 of the subscribed director 104 and distribution module 408 and channel module 406 provide content 420 for download by director 104. Director 104 may then display a channel button 220 for each subscribed channel 412 or for groups of subscribed channels 412. For example, a group of channels 412 related to "fiction" may be grouped under a "fiction" button 220.

In one embodiment, each item of content 402 has a particular ID 422 associated with the item of content. ID 422 comprises the ID 116 of the director 104 associated with the user who generated the content. A user of director 104 may also use e-mail module 110 to send e-mail to other users of other directors 104. More specifically, e-mail module 110 may provide capability to send e-mails to user associated with particular content 420 anonymously. E-mail module 110 may use ID 422 associated with content 420 and SMTP module 410 to route e-mail from one director 104 to another director 104. For example, a corporation may deploy director 104 in order to control web browsing by employees. Content 420 and site data 124 provided to users of the directors 104 may include the ability to anonymously e-mail questions to the human resources department using ID 422 associated with each item of content 420. More specifically, since content 420 has an associated identifier 422 indicating the identifier 116 of the director 104 which generated the content 420, electronic mail messages regarding the content 420 may be routed by channel server 108 to the appropriate human resources personnel. ID 422 may also be set to an ID 116 distinct from the creator of the content so that, for example, a single point-of-contact is maintained for content authored by multiple users. The human resources department may then respond to the questions and the response directed to the appropriate director 104 based on ID 422. SMTP module 410 uses ID module 400 and ID database 402 to determine source and destination directors 104.

FIG. 6 is a flowchart illustrating a method for generating a custom director 104. The method begins at step 500 where user interface 118 is designed for director 104. In one embodiment, a Rapid Application Development (RAD) system may be used to generate director 104, such as Power-Builder. For example, user interface 118 may comprise a display window and navigation buttons for navigating web sites, such as a forward button and a back button.

Director 104 may be provided to users by a company as a marketing tool. Thus, user interface 118 may be customized by the provider of director 104. For example, the company may customize user interface 118 with the logo of the company. For another example, user interface 118 may be styled similarly to products associated with the company, such as a gas company using a fuel station motif for user interface 118 of director 104.

Next, at step 502, director 104 may be linked to services 12. Director 104 may be linked to any, all or none of services 12. If services 12 provided by operating system 14 are not used by a particular director 104, director 104 may use independently generated versions of services 12 providing similar or different functionality. For example, a particular director 104 may have customized HTML support to provide support for non-standard HTML tags used by the company providing director 104 and incorporated into site data 124.

Then, at step 504, electronic mail module 110 may be added to director 104. Electronic mail module 110 is operable to support generation and communication of electronic mail between directors 104 and, optionally, directors 104 and remote sites 17. In one embodiment, electronic mail module 110 uses identifier 116 to identify director 104 as the sender of an electronic mail message and uses SMTP module 410 at channel server 108 to communicate the electronic mail message to the appropriate recipient. For example, content 420 may have identifier 422 identifying the user who generated stored content 420 and electronic mail module 110 may send the electronic mail message using identifier 116 in identifier 422 to determine the destination. SMTP module 410 may then receive the electronic mail message and request identifier module 400 to retrieve information associated with the destination identifier and then communicate the electronic mail message to the director 104 and the user associated with identifier 116 in identifier 422.

Proceeding to step 506, timer module 114 may be added to director 104. Timer module 114 may be provided in any suitable manner. For example, timer module 114 may use a hardware timer and interrupts to provide timing capabilities to director 104.

Next, at step 508, filter module 112 may be added to director 104. Filter module 112 may be provided in any suitable manner. For example, filter module 112 may use a regular expressions engine for filtering links from web pages.

Then, at step 509, an identifier 116 is associated with director 104. As each director 104 typically has an associated unique identifier 116, identifier 116 may be generated such that identifier 116 is unique to the particular director 104. Alternatively, groups of directors 104 may receive similar identifiers 116. In one embodiment, identifier 116 may be of a variable length and be generated as a function of a unique identifier associated with the customizer customizing director 104 and a monotonically increasing integer value. For example, a particular corporation may assigned the identifier "C1234" and that corporation may simply add an integer onto the end of the identifier to identify particular directors 104. More specifically, the first director 104 created at the particular corporation may have an identifier 116 of "C12341" while the next has an identifier of "C12342". In another embodiment, groups of identifiers 116 may be associated with particular entities customizing directors 104. In general, any suitable method may be used for generating identifiers 116 such that identifiers 116 are unique with respect to each other.

Proceeding to step 510, site criteria 120 may be generated by the customizer of director 104. For example, the customizer customizing director 104 for use as a web browser on a corporate intranet may indicate in site criteria 120 that only sites within the corporation's domain are allowed. For another example, a school customizing director 104 for use by children at the school may provide a list of allowed educational sites in site criteria 120. Continuing the above example, the school may further indicate in site criteria 120 that links to sites not listed in site criteria 120 be filtered by filter module 112 so as to avoid inadvertently allowing students to click on links to forbidden sites. In general, any suitable combination of allowed and disallowed sites may be specified in site criteria 120.

Then, at step 512, site list 122 may be generated. More specifically, generating site list 122 comprises specifying one or more URLs to be presented as a slideshow of sites to the user, and the cycle time 154 and banner 156 associated with those sites. Next, at step 514, site data 124 may be added. Site data 124 comprises the web pages associated with the URLs in site list 122. In one embodiment, director 104 is distributed on a CD-ROM and adding site data 124 comprises storing the web pages associated with URLs in site list 122 on the CD-ROM.

Proceeding to step 516, the entity customizing director 104 may reorganize site list 122 so that site list 122 is in the preferred order for the slideshow. Next, at step 518, cycle times 154 may be determined for the URLs in site list 122. The method then ends.

Figure 7:
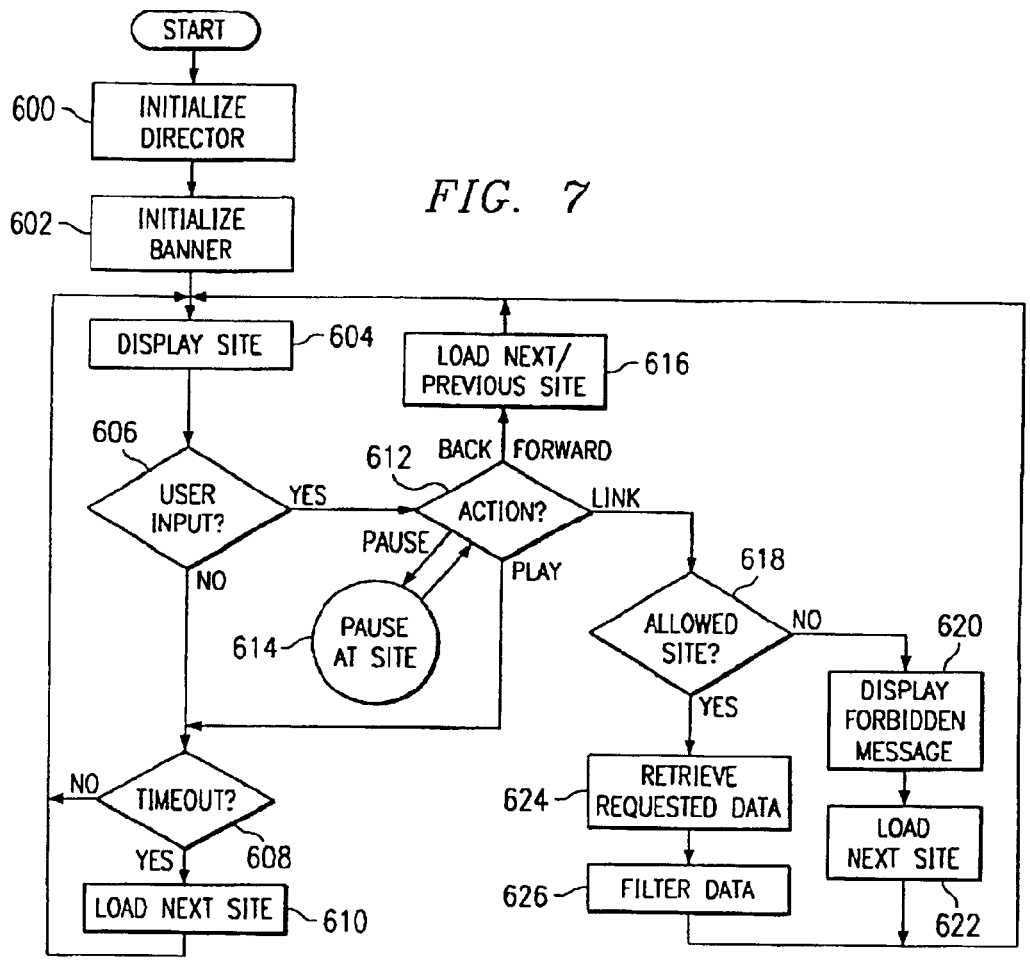
FIG. 7 is a flow chart illustrating a method for using the director of FIG. 2.

FIG. 7 is a flow chart illustrating a method for using director 104. The method begins at step 600 where director 104 is initialized in response to user input at client 102. Next, at step 602, banner 218 is initialized with banner 154 associated with the first site 150 in site list 122. Then, at step 604, the web page associated with the site list 122 is displayed. More specifically, site data 124 associated with the first site 150 and site list 122 is displayed in display area 202.

Proceeding to decisional step 606, director 104 determines whether any user input has been received. If no user input has been received, then the NO branch of decisional step 606 leads to decisional step 608. At decisional step 608, timer module 114 determines whether cycle time 154 for the currently displayed site in site list 122 has timed out. If the currently displayed site has not timed out then the NO branch of decisional step 608 leads to step 604 where the current site continues to be displayed. If the site has timed out, then the YES branch of decisional step 608 leads to step 610 where the next site 150 in site list 122 is loaded. If the site currently being displayed is the last site 150 listed in site list 122, then the first site 150 site list 122 is loaded and the method returns to step 604 where the newly loaded site 150 is displayed.

Returning to decisional step 606, if user input has been received, then the YES branch of decisional step 606 leads to decisional step 612. At decisional step 612, the action to be taken in response to the user input detected at step 606 is determined. If play/pause button 212 has been pressed by the user and if play/pause button 212 was in the pause state, then the PLAY branch of decisional step 612 leads to step 608 where timer module 114 determines whether a time out has occurred. If play/pause button 212 was in the play mode, then the PAUSE branch of decisional step 612 leads to state 614 where site 150 currently being displayed is continued to be displayed even after cycle time 154 for that site has expired. Director 104 may remain in state 164 until another action is selected by the user of director 104. If back button 210 or forward button 214 has been pressed then the BACK/FORWARD branch of decisional step 612 leads to step 616. At step 616, the next or previous site is loaded for display to the user.

In one embodiment, the previous site comprises the site prior to site 150 in site list 122 currently being displayed to the user and the next site comprises the site 150 following the site 150 in site list 122 currently being displayed to the user when the user is viewing sites 150 associated with site list 122. When the user is viewing web pages from remote site 17, step 616 will load the next or previous site based on the order the user has viewed the sites from remote site 17. For example, the user has visited, in order, site A, site B, and site C which are all remote sites 17. If the user is viewing site C and presses the back button 210 then site B would be loaded in step 616. If the user is viewing site C and presses the forward button 214, then no site would be loaded in step 616 because no site is after site C. If the user is at site B and presses back button 210, then site A would be loaded at step 616. If the user is at site B and presses the forward button 214 then site C would be loaded at step 616. In general, when the user is viewing data from remote sites 17, the forward and back buttons 214 and 210 may operate similarly to the forward and back buttons found in common web browsers, such as Internet Explorer by Microsoft Corporation. If the user is viewing sites listed in site list 122, then the back and forward buttons 210 and 214 will cycle through sites and site list 122. If the user presses forward button 214 while viewing the last site 150 in site list 122, director 104 may load the first site in site list 122. Similarly, if the user presses back button 212 while viewing the first site 150 in site list 122, the last site 150 in site list 122 will be loaded.

Referring to FIG. 4, if the user is viewing remote site 300 and presses the back button, director 104 may load site 150 linked to site 300 as shown in FIG. 4. If the user then proceeds to press the forward button after returning to site 150 from site 300, director 104 may load the next site 150 in site list 122 at step 616. Alternatively, director 104 may load remote site 300 in step 616. The method then continues at step 604 where the site loaded in step 616 is displayed.

Turning to decisional step 612, when the user selects a link displayed in display area 202 then the LINK branch of decisional step 612 leads to step 618. At step 618, site criteria 120 is checked to determine whether the URL the user has selected at step 612 is an allowed site. Typically, as filter 112 may be removing forbidden links before the web page is displayed to the user, forbidden sites may still appear in, for example, site data 124, because site criteria 120 may change or be updated such that links to sites in site data 124 now point to forbidden sites. Thus, the check for an allowed site is performed at step 618 after the user has selected a link. If the site is forbidden then the NO branch of decisional step 618 leads to step 620. At step 620 a site forbidden message may be displayed to the user and, at step 622, the next site may be loaded. At step 622, the next site to load may comprise the site being viewed when the user selected the forbidden link. Alternatively, the next site at step 622 may comprise a site selected from site list 122. In general, any suitable criteria may be used to determine the next site for director 104 to load in step 622. The method then proceeds to step 604 where the site loaded at step 622 is displayed to the user.

Returning to decisional step 618, if the site selected by the user is an allowed site then the YES branch of decisional step 618 leads to step 624. At step 624, the web page associated with the site is retrieved from remote site 17 or site data 124 as appropriate. Then, at step 626, filter module 112 filters links from the web page retrieved in step 624 based on site criteria 120. The method then continues to step 604 where the web page is displayed to the user at step 604.

FIG. 8 is a flow chart illustrating a method for collecting statistics using director 104. The method begins at step 700 where a statistics collection enabled banner is displayed and scrolling banner 218 or display area 202. More specifically, the banner displayed in display 202 may comprise a graphical or textual element of a web page. Next, at step 702, director 104 receives the selection of the statistics enabled banner displayed in step 700. Then, at step 704, the URL associated with the statistics enabled banner is communicated to channel server 108.

At step 706, the URL associated with the statistics enabled banner ("statistics URL") is received at channel server 108 and channel server 108 requests the sending director 104 to determine network performance statistics based on the statistics URL. More specifically, the statistics URL may indicate which particular network performance related statistical information to collect as well as the URL upon which statistics are to be gathered. In addition, channel server 108, based on the ID 116 associated with director 104 may alter the indication of which statistics to gather. For example, the network statistics to gather may comprise any of the latency associated with communicating a packet between director 104 and a remote site 17, such as a ping time, the available bandwidth between director 104 and remote site 17, the number of network hops between the director 104 and the remote site 17, and other suitable network related statistical and performance information. Proceeding to step 708, director 104 which sent the statistics URL to channel server 108 communicates with the remote site specified by the statistics URL and channel server 108. Next, at step 710, director 104 gathers whatever statistics and performance information director 104 has been instructed to collect. Next, at step 712, director 104 communicates the collected statistics and performance information to channel server 108.

Then, at step 714, channel server 108 stores the collected statistical and performance information and may distribute it to appropriate remote site 17 and/or directors 104. For example, subscriber database 404, distribution module 408, and/or channel module 406 may specify particular IDs 116 of directors 104 interested in particular statistical data. For example, subscriber database 404 may indicate that a particular remote site 17 is interested in statistical data associated with that remote site and channel server 108 may communicate appropriate statistical and performance information associated with the remote 17 to the remote site 17. For another example, subscriber data base 404 may indicate that particular directors 104 and their associated user may be interested in statistical and performance information regarding particular other directors 104 such as directors 104 deployed by a particular corporation. Then, at step 716, channel server 108 may analyze the statistics and performance information collected by director 104. The analysis may comprise any suitable analysis, such as network performance over time. Proceeding to step 718, channel server 108 may take any necessary action based on the analysis of the statistics and performance information in step 716. For example, channel server 108 may limit the distribution of content 420 to particular directors 104 due to low network performance. In general, channel server 108 may take any suitable action based on the statistics and performance information collected by director 104. The method then ends.

Figure 9:
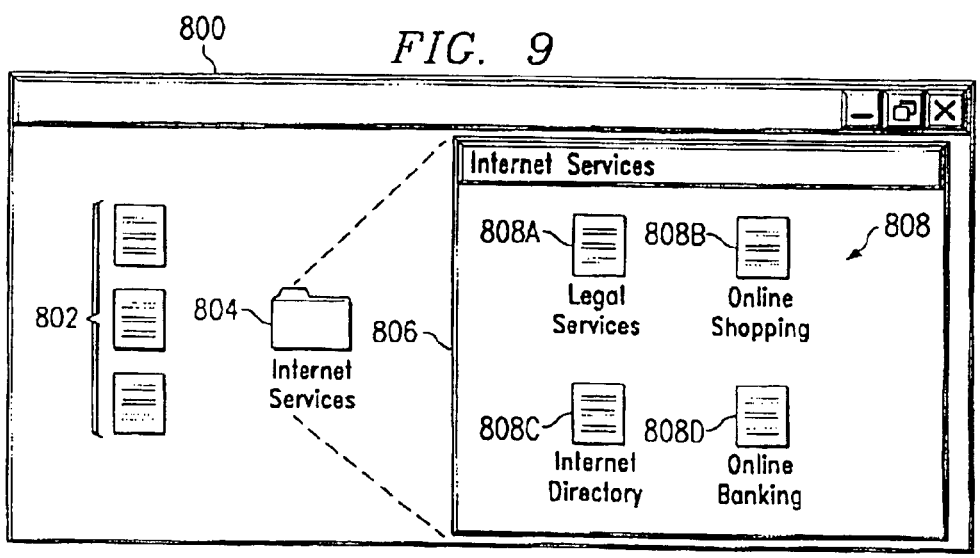
FIG. 9 is a block diagram illustrating a graphical user interface (GUI) associated with an operating system having a plurality of customized directors.

FIG. 9 is a block diagram illustrating a graphic user interface (GUI) associated with an operating system having a plurality of customized directors 104. A GUI 800 comprises one or more icons 802, one or more folders 804, one or more windows 806, and one or more director icons 808. GUI 800 comprises any suitable graphical user interface operable to support icons 802, folders 804 and windows 806. For example, GUI 800 may comprise the Microsoft Windows interface, the Macintosh interface, the X Windows interface and other suitable GUIs. Icons 802 comprise graphical and textual information associated with files, directories, programs and other information indicating information associated with the files, directories and programs. For example, an icon 802 may comprise a graphic associated with a program and a textual identifier of the program such as "spreadsheet." Folders 804 may comprise directories and/or collections of icons and/or files. For example, a folder 804 called "Internet Services" may be used to organize icons 802 associated with Internet related services. Windows 806 comprise collections of icons 802, folders 804, textual data and graphical data. Windows 806 may be operable to open in response to selection of an icon 802 or a folder 804 to display further data.

Director icons 808 may comprise a legal services director icon 808A, an online shopping director icon 808B, an internet directory director icon 808C and an online banking director icon 808D. In general, each director icon 808 represents a director 104 customized for a particular purpose, such as legal services or online banking.

In operation, an "internet services" directory 804 and director icons 808 may be installed as part of the installation of operating system 14. The provider of operating system 14 may partner with providers of directors 104 to install director icons 808 associated with the directors 104 of particular partners. By installing icons 808 for directors 104 along with operating system 14, the providers of directors 104 gain increased exposure and a marketing benefit by being available to a user of the operating system 14 before other programs are installed.

In addition, if a traditional web browser 10 is not installed along with operating system 14, web access may be limited to the use of directors 104 pre-installed with operating system 14. By using directors 104, a client 102 may be provided to a user which provides controlled access to the web. More specifically, corporations and other businesses may use directors 104 to advertise and provide products to users of operating system 14. Since directors 104 are operable to control the web sites visitable by a user of director 104, directors 104 may provide a directed web browsing experience as determined by the sponsor of director 104.

A sponsor may provide free Internet access to a user of operating system 14. In exchange, the sponsor may require the use of a director 104. For example, the free Internet access may be accessible using only director 104 and not be accessible by other web browsers or communication systems. The director 104 may have an associated site list 122 which includes sites associated with the sponsor or advertisers associated with the sponsor. For example, the site list 122 may include a list of sites arranged such that the last site provides general access to the Internet, while the preceding sites include advertising and product information associated with the sponsors of the free Internet service.

In addition, multiple sponsors may provide distinct director icons 808 for inclusion with operating system 14. For example, the multiple director icons 808 may appear on a desktop GUI associated with the operating system 14. By providing director icons 808 with the operating system 14, users of operating system 14 may see the director icons 808 and utilize the associated directors 104.

The present invention provides the capability for customizable network data retrieval. By removing the capability of a user of the director to directly enter a URL, the content retrieved by the user may be controlled and directed. Various URLs and the content associated with the URLs may be predetermined and provided to a user of the director. For example, a corporation may deploy a director to allow utilization of a corporate intranet while preventing and/or limiting employee access to the Internet. For another example, a corporation may deploy a director to users of a free Internet service and the predetermined sites may comprise advertising and product information associated with the corporation providing the free Internet service.

The present invention also provides the capability to distribute content to subscribers of channels. Content may be generated by a user of a director and communicated to a channel server. The content may be associated with a particular channel. The channel server may then distribute the content to subscribers of the associated channel. For example, a corporation may associate a research and development group with a research and development channel. Members of the research and development group may then distribute content, such as new ideas and proposals, to each other.

Content distributed by the channel server to users of directors may also have an identifier associated with the content. The identifier may identify the user who generated the content or a user to contact regarding the content. The identity of the user associated with the identifier may not be known to recipients of the content. Thus, anonymous electronic mail may be sent to the user associated with the identifier associated with the content. For example, a user of a director may author content to be provided over a channel, but not want to reveal their identity. The present invention provides the capability to send electronic mail to the anonymous creator of the content. In addition, the electronic mail may contain only an identifier associated with the user who sent the electronic mail. Thus, electronic mail may be sent anonymously to an anonymous recipient and provide "double-blind" electronic communication.

It should be recognized that other changes, substitutions and alterations are also possible without departing from the spirit and scope of the present invention, as defined by the following claims.

What is claimed is:

1. A directed web browsing system comprising:
    a customizable director residing at a client system and being free of a universal resource locator entry element, the customizable director operable to provide web browsing capabilities by pulling a plurality of web pages from a channel server, and comprising:
        a border portion having a forward element, a play element and a back element;
        a display portion operable to display a first web page, the first web page having a link, the link having an associated second web page; and
    an exclusive set of first web pages associated with the customizable director and wherein a user associated with the customizable director is required to retrieve at least one of the first web pages prior to retrieving a second web page distinct from the first web pages.

2. The system according to claim 1, wherein the customizable director further comprises a timer module operable to determine the expiration of a cycle time associated with the first web pages and generated an indication that the cycle time has expired.

3. The system according to claim 1, wherein the customizable director further comprises a unique identifier and wherein the first web pages have an associated uniform resource locator.

4. The system according to claim 1, wherein the border portion further comprises at least one channel button operable to select a category of content from the channel server.

5. The directed web browsing system according to claim 1 and further comprising a filter module operable to modify the second web page in response to selecting the link based on site criteria associated with the customizable director.

6. A method for directed web browsing comprising:
    providing a director residing at a client system, the director being free of a universal resource locator entry element, the director operable to provide web browsing capabilities by pulling a plurality of web pages from a channel server;
    displaying, using the director, a first web page having a first link, the first link having an associated second web page;
    selecting the first link;
    determining whether a predetermined cycle time associated with the first web page has expired; and
    displaying a third web page in response to the expiration of the predetermined cycle time.

7. The method for directed web browsing according to claim 6 and further comprising filtering the second web page in response to the selection of the first link based on site criteria associated with the web browser.

8. The method for directed web browsing according to claim 7, wherein filtering the second web page comprises:
    comparing at least one second link associated with the second web page to at least one forbidden site associated with the site criteria; and
    removing second links which match at least a portion of any of the forbidden sites associated with the site criteria.

9. The method for directed web browsing according to claim 6 and further comprising:
    receiving a uniform resource locator from a user associated with the director; and
    determining whether the uniform resource locator is associated with an allowed web site based on criteria associated with the director.

10. The method for controlled web browsing according to claim 6, where determining the expiration of the cycle time comprises:
    counting down the cycle time; and
    generating an indication that the cycle time has elapsed.

11. The method for controlled web browsing according to claim 10, wherein displaying the third web page comprises:
    loading the third web page in response to the indication that the cycle time has elapsed; and
    formatting the third web page based on hypertext markup language tags associated with the first web page.

12. A method for directed web browsing comprising:
    customizing a director residing at a client system, the director being free of a universal resource locator entry element, the director operable to provide web browsing capabilities by pulling a plurality of web pages from a channel server;
    determining a first web page to present to a user associated with the director, the first web page having a link associated with a second web page; and
        preventing the user from requesting a third web page distinct from the first and second web pages by removing at least a portion of a uniform resource locator associated with the third web page from the first and second web pages.

13. The method for directed web browsing according to claim 12, wherein preventing the user from requesting the third web page comprises allowing the user to selected the third web page from a further link associated with either of the first and second web pages.

14. A method for directed web browsing comprising:
    customizing a director residing at a client system, the director being free of a universal resource locator entry element, the director operable to provide web browsing capabilities by pulling a plurality of web pages from a channel server, wherein customizing the director comprises:

editing a border associated with the director;
editing a display area associated with the director;
adding at least one navigation element to the border; and
adding at least one sponsor related element to the border;
determining a first web page to present to a user associated with the director, the first web page having a link associated with a second web page;
determining a cycle time associated with the first web page, the cycle time indicating the length of time the first web page is to be displayed to the user; and
preventing the user from requesting a third web page distinct from the first and second web pages by removing at least a portion of a uniform resource locator associated with the third web page from the first and second web pages.

15. The method for directed web browsing according to claim 14, wherein the sponsor comprises a corporation.

16. The method for directed web browsing according to claim 14 and further comprising:
subscribing, by the user, to a channel available from a channel server; and
adding a channel button associated with the channel to the border.

17. The method for directed web browsing according to claim 16 and further comprising:
receiving a first item of content from the channel server; and
generating a second item of content for communication to the channel server and distribution to a further director distinct from the director.

18. The method for directed web browsing according to claim 12, further comprising determining the expiration of a cycle time by:
counting down the cycle time;
determining a fourth web page to display to the user, the fourth web page being associated with the director; and
generating an indication that the cycle time has elapsed.

19. The method for directed web browsing according to claim 18, wherein displaying the fourth web page comprises:
loading the fourth web page in response to the indication that the cycle time has elapsed; and
formatting the fourth web page based on hypertext markup language tags associated with the first web page.

20. The method for directed web browsing according to claim 12 and further comprising filtering the second web page based on site criteria associated with the web browser.

21. The method for directed web browsing according to claim 12 and further comprising determining network performance statistics associated with a remote site.

22. The method for directed web browsing according to claim 21, wherein determining network performance statistics comprises:
receiving, at the director, a selection of a statistics enabled uniform resource locator (URL) associated with the remote site;
communicating a statistics enabled URL to the channel server;
receiving, at the director, a request to determine network performance statistics;
determining network performance data between the director and the remote site; and
communicating the network performance data to the channel server.

23. The method for directed web browsing according to claim 22, wherein the network performance data comprises a latency between the director and the remote site.

24. A method for directed web browsing comprising:
providing a graphical user interface;
displaying a folder on the graphical user interface;
displaying a director icon in the folder, the director icon having an associated director residing at a client system, the director being free of a universal resource locator entry element, the director operable to provide web browsing capabilities by pulling a plurality of web pages from a channel server, the director having an associated exclusive set of first web pages associated with the director and wherein a user associated with the director is required to retrieve at least one of the first web pages prior to retrieving a second web page distinct from the first web pages;
selecting a selected one of the first web pages to present to a user associated with the director in responses to the selection of the associated director icon; and
preventing the user from requesting a third web page distinct from the first and second web pages by removing at least a portion of a uniform resource locator associated with the third web page from the first and second web pages.

25. The method for directed web browsing according to claim 24, wherein the first web pages comprise information associated with a sponsor associated with the director.

26. The method for directed web browsing according to claim 25, wherein the sponsor comprises a corporation.

27. The method for directed web browsing according to claim 24, wherein at least one of the second web pages comprises advertising information associated with a sponsor associated with the director.

28. The method for directed web browsing according to claim 24 and further comprising installing the folder along with the graphical user interface.

29. The method for directed web browsing according to claim 24, wherein the director icon comprises an online banking icon.

30. A channel server for directed web browsing comprising:
an identifier module;
an identifier database operable to communicate with the identifier module and storing at least one identifier;
a subscriber database operable to communicate with the identifier module and associating at least one of the identifiers with at least one channel;
a channel module operable to communicate with the identifier module and distribute content to the subscribers associated with the channels based on the channel;
a distribution module operable to communicate with the identifier module and retrieve content generated by a user associated with a director residing at a client system, the director operable to provide web browsing capabilities by pulling a plurality of web pages from a channel server; and
an electronic mail module operable to communicate with the identifier module and distribute anonymous electronic mail between directors.

31. The system according to claim 1, further comprising a cycle time associated with at least one of the first web pages.

32. The method for directed web browsing according to claim 12, further comprising determining a cycle time associated with the first web page, the cycle time indicating the length of time the first web page is to be displayed to the user.

33. The method for directed web browsing according to claim 24, further comprising determining a cycle time associated with the first web page in response to the selection of the selected one of the first web pages, the cycle time indicating the length of time the selected one of first web pages is to be displayed to the user.

\* \* \* \* \*